US012782121B2

(12) United States Patent
Joo et al.

(10) Patent No.: US 12,782,121 B2
(45) Date of Patent: Nov. 3, 2026

(54) APPARATUS FOR THREE-DIMENSIONAL SHAPE MEASUREMENT

(71) Applicants: KOH YOUNG TECHNOLOGY INC, Seoul (KR); UIF (UNIVERSITY INDUSTRY FOUNDATION), YONSEI UNIVERSITY, Seoul (KR)

(72) Inventors: Chul Min Joo, Goyang-si (KR); Baek Cheon Seong, Seoul (KR)

(73) Assignees: KOH YOUNG TECHNOLOGY INC, Seoul (KR); UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 105 days.

(21) Appl. No.: 18/846,219

(22) PCT Filed: Mar. 10, 2023

(86) PCT No.: PCT/KR2023/003314
§ 371 (c)(1),
(2) Date: Sep. 11, 2024

(87) PCT Pub. No.: WO2023/172105
PCT Pub. Date: Sep. 14, 2023

(65) Prior Publication Data

US 2025/0207912 A1 Jun. 26, 2025

(30) Foreign Application Priority Data

Mar. 11, 2022 (KR) ........................ 10-2022-0030624

(51) Int. Cl.
*G01B 11/25* (2006.01)

(52) U.S. Cl.
CPC .................................. *G01B 11/254* (2013.01)

(58) Field of Classification Search
CPC .............. G01B 11/254; G01B 11/2513; G01B 11/2527; G02B 5/20; G06T 7/0004; G06T 17/30
(Continued)

(56) References Cited

U.S. PATENT DOCUMENTS

| | | | |
|---|---|---|---|
| 6,296,977 | B1 | 10/2001 | Kaise et al. |
| 6,819,361 | B1 | 11/2004 | Lee et al. |

(Continued)

FOREIGN PATENT DOCUMENTS

| | | |
|---|---|---|
| CN | 113418473 | 9/2021 |
| JP | 2000-275582 | 10/2000 |

(Continued)

OTHER PUBLICATIONS

Ben-Eliezer et al. An optimal binary amplitude-phase mask for hybrid imaging systems that exhibit high resolution and extended depth of field. Optics Express. Nov. 26, 2008, vol. 16, pp. 20540-20561 (Year: 2008).*

(Continued)

*Primary Examiner* — Isiaka O Akanbi
(74) *Attorney, Agent, or Firm* — KILE PARK REED & HOUTTEMAN PLLC

(57) ABSTRACT

A three-dimensional shape measurement apparatus, according to an embodiment, comprises: a projector configured to emit patterned light onto the object; and an imaging device configured to image the object, including an optical system, that includes at least one lens defining an optical axis and a binary phase filter disposed on the optical axis of the optical system so as to transmit light, and configured to form an image by using light that has passed through the at least one lens and the binary phase filter. The binary phase filter may include: a first portion comprising at least one pattern extending circumferentially around the optical axis; and a
(Continued)

second portion distinct from the first portion, wherein the first portion and the second portion have different thicknesses in an optical axis direction that is parallel to the optical axis.

8 Claims, 12 Drawing Sheets

(58) Field of Classification Search
USPC .................. 356/601, 624, 610, 237.2–237.6
See application file for complete search history.

(56) References Cited

U.S. PATENT DOCUMENTS

| | | | | |
|---|---|---|---|---|
| 7,423,745 | B2 * | 9/2008 | Moribe | G01N 21/95692 356/237.4 |
| 8,384,876 | B2 * | 2/2013 | Heo | G03B 27/42 355/77 |
| 12,554,119 | B2 * | 2/2026 | Matsumoto | G02B 26/02 |
| 2008/0278729 | A1 * | 11/2008 | Kim | G01B 11/2513 356/450 |
| 2011/0080471 | A1 * | 4/2011 | Song | G06T 7/521 356/627 |
| 2015/0316488 | A1 * | 11/2015 | Masumura | G01N 21/9501 356/237.2 |
| 2016/0266368 | A1 * | 9/2016 | Watanabe | G02B 21/365 |
| 2019/0323829 | A1 * | 10/2019 | Suenaga | G01B 11/2545 |
| 2019/0388193 | A1 | 12/2019 | Saphier et al. | |
| 2019/0388194 | A1 | 12/2019 | Atiya et al. | |
| 2020/0088985 | A1 * | 3/2020 | Hirata | G02B 21/086 |
| 2020/0238442 | A1 | 7/2020 | Zhang et al. | |
| 2021/0199425 | A1 * | 7/2021 | Angot | G01B 11/2513 |
| 2022/0280269 | A1 | 9/2022 | Saphier et al. | |
| 2023/0168487 | A1 * | 6/2023 | Matsumoto | G02B 21/0076 359/237 |
| 2024/0138961 | A1 | 5/2024 | Saphier et al. | |
| 2024/0156577 | A1 | 5/2024 | Saphier et al. | |
| 2025/0032227 | A1 | 1/2025 | Saphier et al. | |
| 2025/0195183 | A1 | 6/2025 | Saphier et al. | |

FOREIGN PATENT DOCUMENTS

| | | |
|---|---|---|
| JP | 2008-281543 | 11/2008 |
| JP | 2009-180708 | 8/2009 |
| JP | 2011-112639 | 6/2011 |
| JP | 2013-162369 | 8/2013 |
| JP | 2021-514839 | 6/2021 |
| JP | 2021-527830 | 10/2021 |
| KR | 10-1998-0064642 | 10/1998 |
| KR | 10-2001-0047006 | 6/2001 |

OTHER PUBLICATIONS

Chen et al. Super-oscillatory focusing of circularly polarized light by ultra-long focal length planar lens based on binary amplitude-phase modulation. Scientific Reports. Jun. 29, 2016, vol. 6, pp. 1-8 (Year: 2016).*

Extended European Search Report for European Application No. 23767206.8, dated Jun. 11, 2025.

Japanese Office Action dated Sep. 2, 2025, in Japanese Patent Application No. 2024-554247 [including English machine translation].

Ben-Eliezer et al., "An optimal binary amplitude-phase mask for hybrid imaging systems that exhibit high resolution and extended depth of field", Optics Express, Nov. 26, 2008, pp. 20540-20561, vol. 16, No. 25.

Chen et al., "Super-oscillatory focusing of circularly polarized light by ultra-long focal length planar lens based on binary amplitude-phase modulation", Scientific Reports, Jun. 29, 2016, pp. 1-8.

Ryu et al., "Light sheet fluorescence microscopy using axi-symmetric binary phase filters", Biomedical Optics Express, Jun. 23, 2020, pp. 3936-3951, vol. 11, No. 7.

Ryu et al., "Design of binary phase filters for depth-of-focus extension via binarization of axisymmetric aberrations", Optics Express, Nov. 17, 2017, pp. 30312-30326, vol. 25, No. 24.

International Search Report, with English translation, corresponding to International Application No. PCT/KR2023/003314 dated May 31, 2023.

Written Opinion, with English translation, corresponding to International Application No. PCT/KR2023/003314, dated May 31, 2023.

Korean Office Action with English translation for Korean Patent Application or Patent No. 10-2022-0030624, dated Jan. 2, 2024.

Korean Final Office Action with English translation for Korean Patent Application or Patent No. 10-2022-0030624, dated Aug. 21, 2024.

* cited by examiner

I - I'

APPARATUS FOR THREE-DIMENSIONAL SHAPE MEASUREMENT

TECHNICAL FIELD

The present disclosure relates to a three-dimensional shape measurement apparatus for measuring a three-dimensional shape of an object.

BACKGROUND

In the industrial fields, various methods are being used to measure the three-dimensional image of an object. Among these, a method for emitting specific patterned light onto the object, measuring a resulting moiré pattern, and obtaining, therefrom, a three-dimensional image of the object is being used. This moiré-based three-dimensional image measurement technology is applied in a variety of fields, such as inspecting dents, scratches, and irregularities on the surface of a manufactured product or inspecting the quality of component mounting and soldering on a semiconductor substrate.

In order to accurately measure a three-dimensional shape, an imaging device requires high resolving power and a high depth of field. However, as the depth of field of the imaging device increases, the resolving power decreases, and conversely, as the resolving power increases, the depth of field decreases. Therefore, the depth of field and the resolving power have a trade-off relationship.

SUMMARY

Embodiments of the present disclosure provide an optical element or a three-dimensional shape measurement apparatus configured to increase the depth of field of an imaging device while avoiding or minimizing a decrease in the resolving power thereof.

The present disclosure provides embodiments of a three-dimensional shape measurement apparatus for measuring a three-dimensional shape of an object. A three-dimensional shape measurement apparatus, according to a representative embodiment, includes: a projector configured to emit patterned light onto the object; and an imaging device configured to image the object, including an optical system, that includes at least one lens defining an optical axis and a binary phase filter disposed on the optical axis of the optical system so as to transmit light, and configured to form an image by using light that has passed through the at least one lens and the binary phase filter. The binary phase filter may include: a first portion comprising at least one pattern extending circumferentially around the optical axis; and a second portion distinct from the first portion, wherein the first portion and the second portion have different thicknesses in an optical axis direction that is parallel to the optical axis.

In an embodiment, a thickness of the first portion in the optical axis direction may be less than a thickness of the second portion in the optical axis direction.

In an embodiment, in case that $n_1$ is the refractive index of air, $n_2$ is the refractive index of the binary phase filter, and $\lambda_{center}$ is the center wavelength of light emitted by the projector, a difference between the thicknesses of the first portion and the second portion in the optical axis direction may be $$\frac{\lambda_{center}/2}{n_2 - n_1}.$$

In an embodiment, the first portion may include multiple patterns that are concentric with each other and radially spaced apart from each other.

In an embodiment, the at least one pattern of the first portion may include an annular pattern.

In an embodiment, the second portion may be a remaining portion of the binary phase filter excluding the first portion.

In an embodiment, the at least one lens may include two lenses sharing the optical axis and spaced apart from each other, and the binary phase filter is disposed between the two lenses.

In an embodiment, the first portion may be formed by one of thin film deposition, etching, imprinting, and a holographic film.

In an embodiment, the patterned light may be a sinusoidal fringe pattern.

In an embodiment, the three-dimensional shape measurement may further include at least one processor configured to generate data related to the three-dimensional shape of the object based on an image of the patterned light emitted onto the object, that is acquired by the imaging device.

According to an embodiment of the present disclosure, a three-dimensional shape measurement apparatus may be configured to have high resolving power while still having a deep depth of field.

An embodiment of the present disclosure enables contactless three-dimensional shape measurement without the need to directly contact a member, such as a probe, to the surface of a three-dimensional object. In addition, the three-dimensional shape of the object may be measured while photographing the object in real time, so that even when the surface shape of the object changes, the change may be measured in real time. In addition, the imaging device may have a deep depth of field, and may thus capture a high-resolution image of an object with a relatively large area.

DETAILED DESCRIPTION

Figure 1:
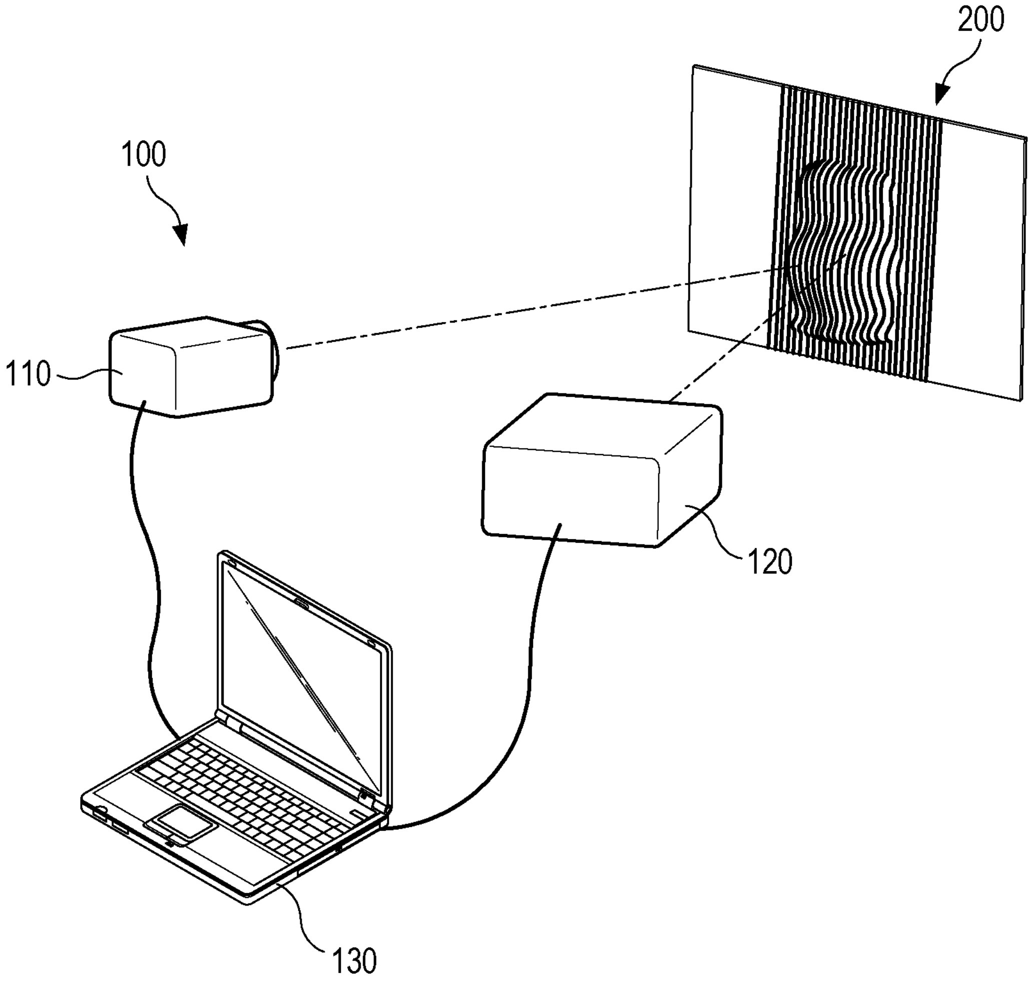
FIG. 1 illustrates a three-dimensional shape measurement apparatus according to an embodiment.

Embodiments of the present disclosure are illustrated for describing the technical idea of the present disclosure. The scope of the claims according to the present disclosure is not limited to the embodiments described below or to the detailed descriptions of these embodiments.

All technical or scientific terms used in the present disclosure have meanings that are generally understood by a person having ordinary knowledge in the art to which the present disclosure pertains, unless otherwise specified. The terms used in the present disclosure are all selected for only more clear description of the present disclosure, and are not intended to limit the scope of claims according to the present disclosure.

The expressions "include", "provided with", "have" and the like used in the present disclosure should be understood as open-ended terms connoting the possibility of inclusion of other embodiments, unless otherwise mentioned in a phrase or sentence including the expressions.

A singular expression in the present disclosure may include meanings of plurality, unless otherwise mentioned, and the same is applied to a singular expression stated in the claims.

The terms "first", "second", etc. used in the present disclosure are used to distinguish multiple components from one another, and are not intended to limit the order or importance of the relevant components.

The expression "based on" used in the present disclosure is used to describe one or more factors that influences a decision, an action of judgment, or an operation described in a phrase or sentence including the relevant expression, and this expression does not exclude an additional factor influencing the decision, the action of judgment, or the operation Hereinafter, embodiments of the present disclosure will be described with reference to the accompanying drawings. In the accompanying drawings, identical or corresponding components are indicated by identical reference numerals. In the following description of embodiments, redundant descriptions of the identical or corresponding components will be omitted. However, the omission of a description of a component does not imply that such a component is not included in an embodiment.

Hereinafter, a three-dimensional shape measurement apparatus according to an embodiment of the present disclosure will be described with reference to FIGS. 1 to 4.

FIG. 1 illustrates a three-dimensional shape measurement apparatus 100 according to an embodiment.

The three-dimensional shape measurement apparatus 100 measures the three-dimensional shape of an object by capturing an image of patterned light that has been emitted onto the object by a projector 120. In an embodiment, the three-dimensional shape measurement apparatus 100 includes an imaging device 110 and the projector 120. The three-dimensional shape measurement apparatus 100 may further include an analysis device 130.

The imaging device 110 may be configured to image an object 200. The imaging device 110 includes an optical system having a lens defining an optical axis. The optical system may include a binary phase filter (a binary phase filter 140 in FIG. 2) described later. The lens may include at least one lens element. The imaging device 110 includes an image sensor. The image sensor is configured to collect light, which has passed through the lens, to generate image data of the object 200.

The projector 120 may be configured to emit patterned light onto an object 200. In an embodiment, the projector 120 may emit a structured patterned light onto the surface of the object 200. For example, the projector 120 may emit light in a sinusoidal fringe pattern onto the object 200.

The patterned light is phase-modulated while being emitted onto the three-dimensional surface of the object 200, and the imaging device 110 acquires an image of the phase-modulated patterned light. The analysis device 130 may include at least one processor configured to generate data related to the three-dimensional shape of the object 200 based on the image of the patterned light acquired by the imaging device 110.

For example, when light in a fringe pattern is emitted onto the object 200, the imaging device 110 may capture a fringe pattern that is phase-modulated by the object height distribution. The processor may calculate the phase modulation by using a fringe analysis technique (including a Fourier transform method, phase stepping, spatial phase detection techniques, and the like). The processor may use an appropriate phase unwrapping algorithm to obtain a continuous phase distribution, and may correct and transform the obtained continuous phase distribution into actual three-dimensional height information. However, in the present disclosure, a method for generating data about a three-dimensional shape by analyzing a pattern that has been emitted onto the object 200 and modulated may be implemented in ways different from those described above.

In order to accurately measure a three-dimensional shape, the patterned light emitted onto the object 200 must be acquired with high resolving power (or resolution power). Resolving power is an indicator of the ability of imaging device to form an image, and refers to the ability of the imaging device to distinguish between two objects that are spaced apart from each other. On the other hand, the depth of field of the imaging device 110 refers to an area in an image that can be considered to be in focus. In order to clearly measure an image of patterned light emitted onto the surface of the object 200 having a three-dimensional shape, the depth of field of the imaging device 110 must be deepened (or extended) to cover the range of distance between the three-dimensional shape and the imaging device 110.

Figure 2:
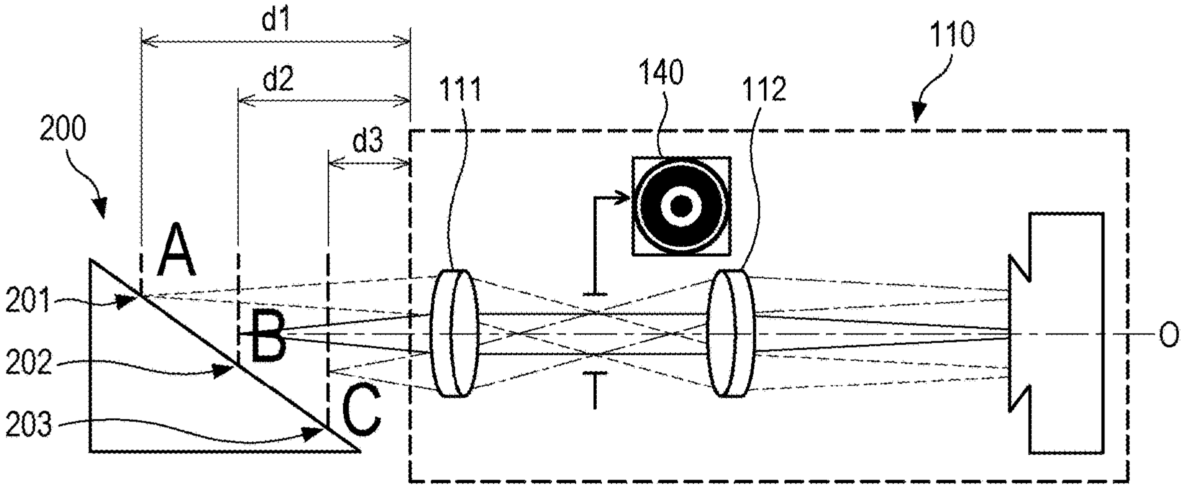
FIG. 2 illustrates an imaging device employing a binary phase filter that increases the depth of field according to an embodiment.

FIG. 2 illustrates an imaging device 110 employing a binary phase filter 140 that increases the depth of field according to an embodiment. Referring to FIG. 2, when patterned light is emitted onto a first region 201, a second region 202, and a third region 203 of an object 200 by a projector (e.g., the projector 120 in FIG. 1), the imaging device 110 must capture images of the patterned light in high resolution across all regions so that the three-dimensional shape of the object 200 can be accurately measured. That is, the depth of field of the imaging device 110 must be configured to cover the first region 201 to the third region 203. For example, when a pattern of an image of the patterned light emitted onto the first region 201 located at a first distance d1 from the imaging device 110 is denoted as "A", a pattern of an image of the patterned light emitted onto the second region 202 located at a second distance d2 from the imaging device 110 is denoted as "B", a pattern of an image of the patterned light emitted onto the third region 203 located at a third distance d3 from the imaging device 110 is referred to as "C", the depth of field of the imaging device

110 must include a range corresponding to at least the first distance d1 to the third distance d3 in order for "A", "B", and "C" to all be clearly imaged.

On the other hand, a depth of field is inversely proportional to a numerical aperture numerical aperture (or f-number) of a lens, while resolving power is proportional to the numerical aperture of the lens. Therefore, when the depth of field is extended, the resolving power may be decreased. In an embodiment, the binary phase filter 140 may be applied in order to extend the depth of field while preventing or minimizing a decrease in the resolving power. In an embodiment, the imaging device 110 may include the binary phase filter 140. The binary phase filter 140 may optically interact with optical elements constituting an optical system. In the present disclosure, the optical system may be understood as a concept including the binary phase filter 140. That is, the binary phase filter 140 may constitute a portion of the optical system of the imaging device 110. For example, referring to FIG. 2, the binary phase filter 140 may be disposed between a first lens 111 and a second lens 112 arranged along an optical axis O. However, FIG. 2 merely illustrates an example in which the binary phase filter 140 is disposed in the imaging device 110, and the imaging device 110 of the present disclosure is not limited to the illustrated embodiment.

By including the binary phase filter 140, the imaging device 110 may image all three-dimensional surfaces in the range of the first distance d1 to the third distance d3 (e.g., the first region 201 to the third region 203) at high resolution.

Figure 3:
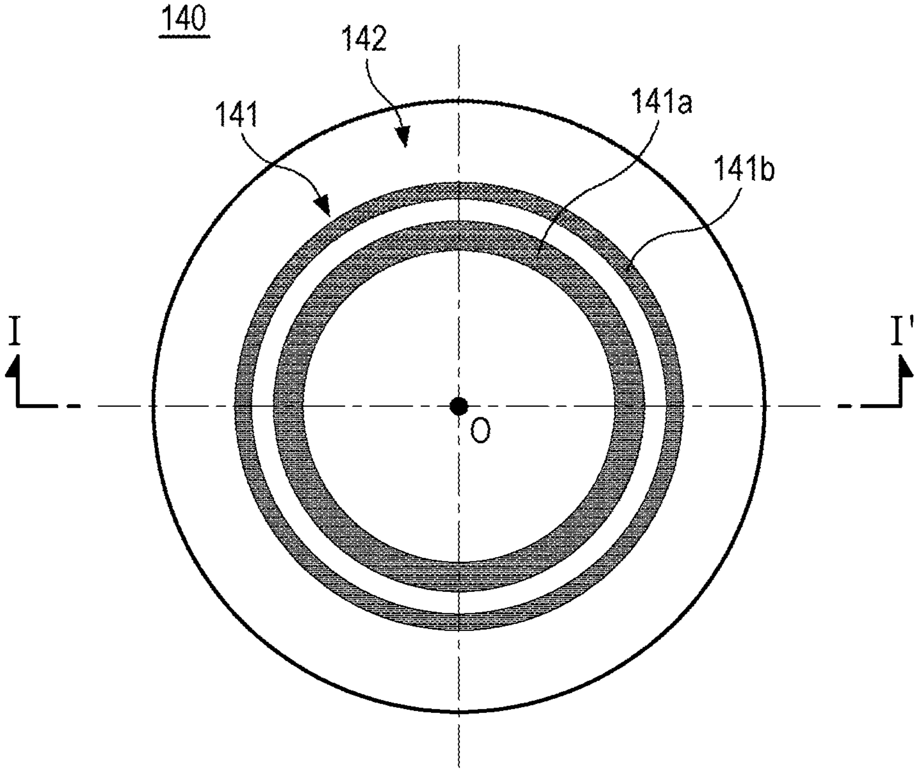
FIG. 3 is a top view of a binary phase filter according to an embodiment.
Figure 4:
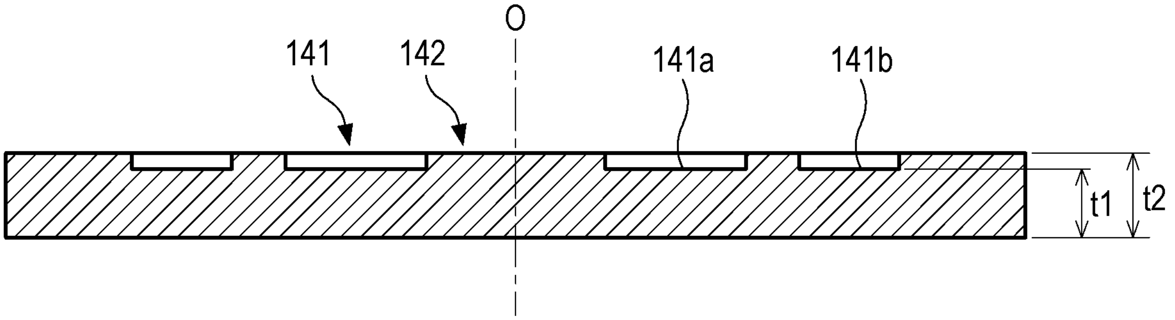
FIG. 4 is a cross-sectional view of the binary phase filter in FIG. 3 taken along line I-I'.

FIG. 3 is a top view of a binary phase filter 140 according to an embodiment. FIG. 4 is a cross-sectional view of the binary phase filter 140 in FIG. 3 taken along line I-I'.

The binary phase filter 140 may include a first portion 141 including at least one pattern extending circumferentially around an optical axis O, and a second portion 142 distinct from the first portion 141. The at least one pattern may include an annular pattern. For example, the first portion 141 may include a first pattern 141*a* and a second pattern 141*b*. The second portion 142 of the binary phase filter 140 may be defined as a portion excluding the first portion 141.

The first portion 141 may include multiple patterns that are spaced apart from and concentric with each other. The multiple patterns may be radially spaced apart from each other. At least one of the multiple patterns may be an annular pattern. In one example, the first portion may include a circular pattern having an inner diameter of 0 and at least one annular pattern. In another example, the first portion may include only multiple annular patterns.

The multiple patterns may have different widths (the difference between inner and outer diameters). The multiple patterns may have different inner diameters. For example, referring to FIGS. 3 and 4, the first portion 141 may include the first pattern 141*a* and the second pattern 141*b*. The first pattern 141*a* and the second pattern 141*b* are radially spaced apart from and concentric with each other.

The patterns also include patterns having an inner diameter of 0. For example, when the inner diameter of the first pattern 141*a* is 0 as shown, the first pattern 141*a* may be a circular pattern. Also, in the illustrated embodiment, the first portion 141 includes two patterns 141*a* and 141*b*. However, this is merely an example, and the first portion 141 may include one pattern or at least three patterns.

In an embodiment, the first portion 141 and the second portion 142 may be configured such that, in light reaching a point, the optical phase difference between the light passing through the first portion 141 and the light passing through the second portion 142 is 180 degrees.

In an embodiment, the first portion 141 and the second portion 142 may be configured such that in the light reaching a point, the optical path difference between the light passing through the first portion 141 and the light passing through the second portion 142 is half the center wavelength of light emitted by the light source (e.g., light emitted by the projector 120).

In an embodiment, the light passing through one of the first portion 141 or the second portion 142 may have a phase difference of 180 degrees via a phase-only spatial light modulator (SLM) or a grating light valve (GLV), compared to the light passing through the other of the first portion 141 or the second portion 142. It is assumed that the light passing through the first portion 141 and the light passing through the second portion 142 reach the same point.

In an embodiment, the optical path difference between the first portion 141 and the second portion 142 may be implemented by a physical step between the first portion 141 and the second portion 142. For example, referring to FIG. 4, the binary phase filter 140 may have different thicknesses in the first portion 141 and the second portion 142. The physical step between the first portion 141 and the second portion 142 may be implemented, for example, by a method such as imprinting, thin film deposition, wet/dry etching, or holographic film attachment.

In an embodiment, the first portion 141 and the second portion 142 may have different thicknesses in a direction parallel to the optical axis O (or in the optical axis direction). For example, a thickness t1 of the first portion 141 in the optical axis direction may be less than a thickness t2 of the second portion 142 in the optical axis direction.

In an embodiment, the thickness difference (t2−t1) between the first portion 141 and the second portion 142 may be determined such that in light reaching a point, the optical path difference between the light passing through the first portion 141 and the light passing through the second portion 142 is half the center wavelength.

For example, the thickness difference (Δt) between the first portion 141 and the second portion 142 may be determined by Equation 1.

$$\Delta t = \frac{\lambda_{center}/2}{n_2 - n_1} \quad \text{[Equation 1]}$$

$n_1$ is the refractive index of air, $n_2$ is the refractive index of the binary phase filter 140, and $\lambda_{center}$ is the center wavelength of light emitted by the projector 120. The center wavelength ($\lambda_{center}$) may be calculated by Equation 2 when the spectrum (wavelength-dependent intensity) of the light emitted by the projector 120.

$$\lambda_{center} = \frac{\int f(\lambda)\lambda d\lambda}{\int f(\lambda)d\lambda} \quad \text{[Equation 2]}$$

$f(\lambda)$ is the spectral flux at a wavelength λ.

The binary phase filter 140 illustrated in FIGS. 3 and 4 is only an exemplary form, and the binary phase filter 140 of the present disclosure is not limited thereto.

In an embodiment, the binary phase filter 140 may be configured to extend the depth of field while preventing or minimizing a decrease in resolving power. In an embodiment, the binary phase filter 140 may be designed to be optimized for the optical system to which it is applied. In an embodiment, the binary phase filter 140 may be optimized to implement the imaging device 110 capable of capturing an image of a three-dimensional surface at targeted resolving power (or resolution) in a targeted depth-of-field range.

Hereinafter, a method for optimizing a binary phase filter applied to the imaging device 110 for measuring a three-dimensional shape will be described with reference to FIGS. 5 to 8.

Figure 5:
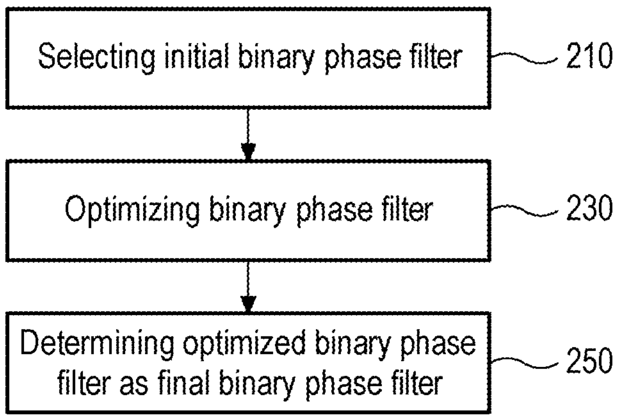
FIG. 5 is a flowchart of a method for optimizing a binary phase filter according to an embodiment.
Figure 6:
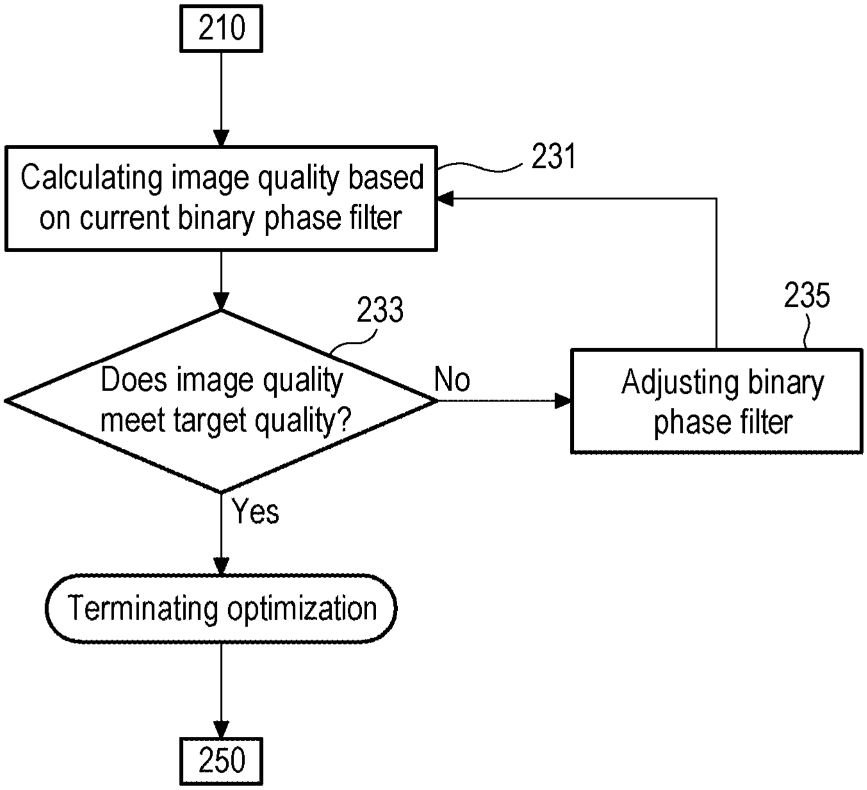
FIG. 6 is a flowchart according to an embodiment of the step of optimizing a binary phase filter in FIG. 5.
Figure 7:
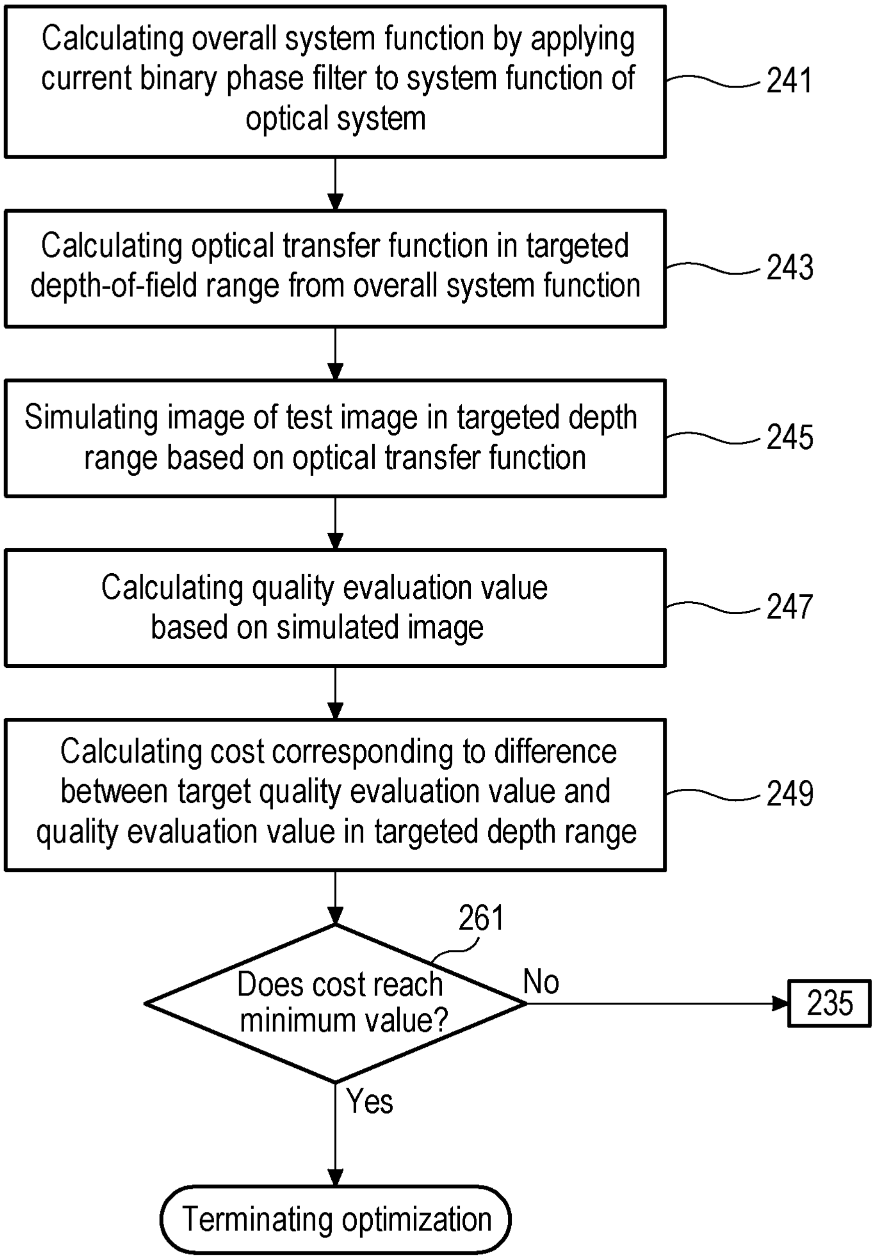
FIG. 7 is a flowchart according to an embodiment of the step of calculating image quality and the step of determining whether the image quality meets target quality, as shown in FIG. 6.
Figure 8:
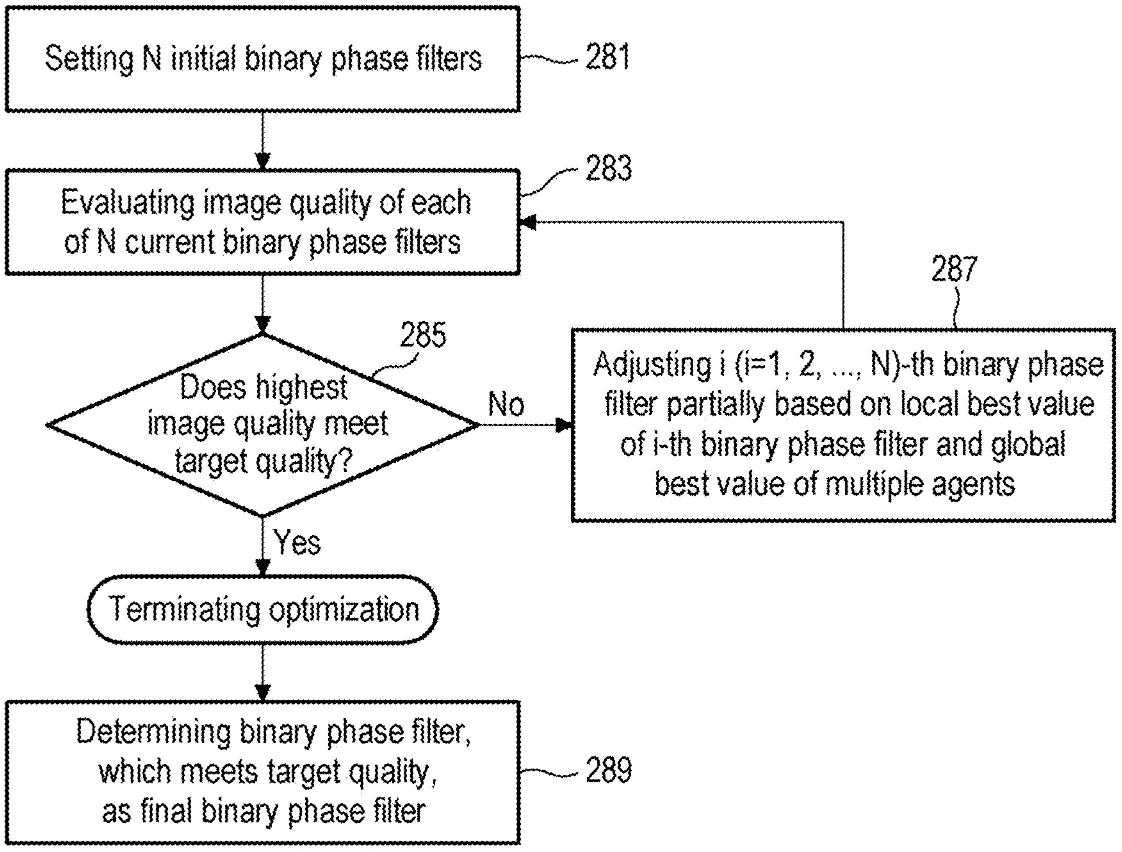
FIG. 8 is a flowchart illustrating a process of optimizing a binary phase filter by using a Particle Swarm Optimization algorithm according to an embodiment of the binary phase filter optimization step in FIG. 5.

FIG. 5 is a flowchart of a method for optimizing a binary phase filter according to an embodiment. FIG. 6 is a flowchart according to an embodiment of the step of optimizing a binary phase filter in FIG. 5. FIG. 7 is a flowchart according to an embodiment of the step 231 of calculating image quality and the step 233 of determining whether the image quality meets target quality, as shown in FIG. 6. FIG. 8 is a flowchart illustrating a process of optimizing a binary phase filter by using a Particle Swarm Optimization algorithm according to an embodiment of the binary phase filter optimization step 230 in FIG. 5.

Although process steps, method steps, algorithms, and the like have been described in a sequential order in the flowcharts illustrated in FIGS. 5 to 8, the processes, the methods, and the algorithms may be configured to operate in any suitable order. In other words, the steps of processes, methods, and algorithms described in various embodiments of the present disclosure need not be performed in the order described in the present disclosure. Furthermore, although some steps are described as being performed asynchronously, the some steps may be simultaneously performed in other embodiments. Furthermore, an example of a process by depiction in the drawings neither implies that the exemplified process excludes other changes and modifications thereto, nor implies that the exemplified process or any of steps of the process is essential to one or more of various embodiments of the present disclosure, nor implies that the exemplified process is preferred.

Referring to FIG. 5, a binary phase filter optimization method includes a step 210 of selecting an initial phase filter. The binary phase filter optimization method includes a step 230 of optimizing a binary phase filter based on an initial phase filter. The binary phase filter optimization method includes a step 250 of determining the optimized binary phase filter as a final binary phase filter.

In an embodiment, before optimizing a binary phase filter, the binary phase filter may be represented in matrix form. The radius of a circle corresponding to the boundary between the first portion 141 and the second portion 142 may be set as a variable. For example, a binary phase filter represented as a matrix $\overline{p}=\{p_1, p_2, p_3, \ldots, p_j\}$ may correspond to a phase filter where the first portion 141 and the second portion 142 are neighboring with a boundary between circles having radii of $p_1, p_2, p_3, \ldots, p_j$. The variables $(p_1, p_2, p_3, \ldots, p_j)$ that constitute the binary phase filter may be selected or determined through a conditional expression to have values between 0 and the pupil radius. The values of the variables defining the binary phase filter are adjusted during the optimization process, and an optimal binary phase filter may be determined by the values of the variables when the optimal solution is determined.

Referring to FIG. 6, the step 230 of optimizing the binary phase filter may include a step 231 of calculating an image quality based on a current binary phase filter. In the step 231, the image quality may be numerically evaluated. When the step 231 is performed for the first time, the current binary phase filter may be determined in the initial binary phase filter selection step 210 in FIG. 5.

The step 230 may include a step 233 of determining whether the image quality meets a target quality. In the step 233, it may be determined whether to adjust the binary phase filter based on whether the image quality based on the current phase filter meets the target quality.

The step 230 may include a step 235 of adjusting the binary phase filter, which is performed when the image quality does not meet the target quality in the step 233. In the present disclosure, adjusting a binary phase filter implies adjusting the values of variables defining the binary phase filter. After the step 235, the step 231 is performed again. During this process, the binary phase filter may be adjusted multiple times. The "current binary phase filter" refers to the most recent binary phase filter at the time a specific step is performed. For example, in the first step 233, the current binary phase filter is the initial binary phase filter, and in the step 233 performed after the step 235, the current binary phase filter is the binary phase filter adjusted in the step 235.

When the image quality meets the target quality in the step 233, the step 230 of optimizing the binary phase filter ends. In this case, the step 250 of determining the current binary phase filter as the final binary phase filter may be performed.

Referring to FIG. 7, in an embodiment, a system function of an optical system constituting an imaging device (e.g., the imaging device 110 in FIG. 1) and an optical transfer function calculated from the system function may be used to evaluate image quality. Here, the system function is the system function of an optical system excluding a binary phase filter.

The system function is a function that simulates the optical system included in the imaging device, and includes information about optical elements constituting the optical system, excluding the binary phase filter. For example, the system function may include information about the number of lenses constituting the optical system, the shape of the lenses (convex or concave), the spacing between the lenses, the refractive index of the lenses, the Abbe number of the lenses, an aperture, a filter, etc. The system function may be provided by optical design software such as Zemax, CodeV, LightTools, ASAP, or TracePro.

The performance of an optical system (i.e., the quality of an image captured by the optical system) may be evaluated by a convolution of the point spread function (PSF) and the image. The optical transfer function (OTF) has a Fourier transform relationship with the point spread function, and both functions may be calculated from the system function. When a test image is convolved with a point spread function calculated by a system function corresponding to a specific optical system, an image of a test target captured using the optical system may be simulated. For example, "USAF 1951", "Ronchi Ruling", "Star", etc., which are designed to help evaluate and correct the performance of an imaging system, may be used as the test image.

The performance of the system function may be evaluated by simulating an image using the optical transfer function and evaluating the quality of the simulated image. The quality of the image may be quantified by an evaluation value related to the image quality from the simulated image, and the quality of images may be evaluated based on a quality evaluation value. A method for evaluating the quality of the image may include a full-reference evaluation method that references an undistorted image or a no-reference evaluation method that does not reference the undistorted image. The full reference evaluation method may include mean square error (MSE), peak signal to noise ratio (PSNR), structure similarity (SSIM), etc. The no-reference evaluation method may include Blind/Referenceless Image Spatial Quality Evaluator (BRISQUE), Natural Image Quality Evaluator (NIQE), Perception-based Image Quality Evaluator (PIQE), etc.

In an embodiment, referring to FIGS. 6 and 7, the step 231 of calculating the image quality may include a step 241 of calculating the overall system function of an optical system to which a current binary phase filter applied. The system function of the optical system, excluding the binary phase filter, is fixed. However, when the current binary phase filter changes while the optimization is being performed, an overall system function will change correspondingly.

The step 231 may include a step 243 of calculating an optical transfer function in a targeted depth-of-field range from the overall system function calculated in the step 241. One or more optical transfer functions capable of simulating a subject within the targeted depth-of-field range from the optical system may be derived from the overall system function. For example, when the targeted depth-of-field range is at a distance of d1 to d2 from the optical system, n+1 optical transfer functions may be calculated to simulate a subject at a distance of d1, d1+(d2−d1)*1/n, d1+(d2−d1)*2/n, . . . , d1+(d2−d1)*(n−1)/n, or d2 from the optical system. In the present disclosure, an optical transfer function capable of simulating a subject positioned at a specific distance d refers to an optical transfer function, that is configured such that the result of convolution of the optical transfer function with a test image simulates the result of capturing, by an imaging device, the test image positioned at the distance d from the imaging device.

The step 231 may include a step 245 of simulating an image of the test image in the targeted depth range based on the optical transfer function calculated in the step 243. In the step 245, the image of the test image within a distance range corresponding to the targeted depth of field from the imaging device may be simulated by a convolution of the test image with multiple optical transfer functions corresponding to the targeted depth range. When the multiple optical transfer functions corresponding to the targeted depth-of-field range are calculated in the previous step 243, image simulation using all of the multiple optical transfer functions may be performed.

The step 231 may include a step 247 of calculating a quality evaluation value based on the image simulated in the previous step 245. The step 230 may include a step 249 of calculating a cost corresponding to the difference between the quality evaluation value calculated in the previous step 247 and a target quality evaluation value.

In the step 249, based on the optical transfer function for a step targeted depth-of-field range, the performance of the imaging device in the targeted depth range may be evaluated. In the present disclosure, evaluating the performance (or image quality) of the imaging device implies calculating a quality evaluation value indicating whether the image quality is high or low. The image of the test image may be simulated in the targeted depth range based on the light transfer function, and the quality evaluation value may be calculated based on the simulated image. It may be determined whether the quality evaluation value in the targeted depth range is close to the target quality evaluation value. In the present disclosure, the difference between the quality evaluation value in the target depth range and the target quality evaluation value may be referred to as a "cost." When a current quality evaluation value is close to the target quality evaluation value, the cost approaches 0, which indicates that the image quality is excellent. Therefore, in the present disclosure, the "cost" may be understood as a type of quality evaluation value. When the cost is sufficiently reduced, the current binary phase filter may be determined as a final binary phase filter.

The cost y may be calculated, for example, by Equation 3.

$$y = \underset{\overline{p}_t}{\operatorname{argmin}}\left[\sum_{z=1}^{Z} f_0 - f(z, \overline{p}_t) + \lambda \sum_{z=1}^{Z-1} f(z+1, \overline{p}_t) - f(z, \overline{p}_t)\right] \quad \text{[Equation 3]}$$

f is an image quality evaluation value, $f_0$ is a target image quality evaluation value, $\overline{p}_t$ is a matrix of a binary phase filters at the t-th iteration, z is an index assigned by distance between the imaging device and the object 200, and λ is a regularization coefficient. For example, the quality evaluation value of an image that simulates a test image positioned to correspond to a lower limit of the targeted depth-of-field range may be $f(1, \overline{p}_t)$, the quality evaluation value of an image that simulates the test image positioned to correspond to an upper limit of the targeted depth-of-field range may be $f(Z, \overline{p}_t)$.

The step 261 is a part of the step 233 in FIG. 6 of determining whether the image quality meets the target quality. In the step 261, it is determined whether the cost y has arrived at a minimum value, and depending on the result, further optimization may proceed or the optimization may be terminated. The arrival of the cost y at the minimum value implies that the cost no longer decreases significantly (or beyond a predetermined threshold) or that the cost becomes 0. When optimization is in progress, the binary phase filter may be adjusted by step 235 to minimize the cost y.

Referring to FIGS. 6 and 8, in an embodiment, the step 235 of adjusting the binary phase filters may be performed using a Particle Swarm Optimization (PSO) algorithm. The step 235 may include a step 281 of setting N initial binary phase filters. The step 235 may include a step 283 of evaluating the image quality of each of the N current binary phase filters. The step 235 may include a step 285 of determining whether the highest image quality evaluated in the previous step 283 meets a target quality. The step 235 may include a step 287 of adjusting the N binary phase filters using the PSO algorithm when the image quality did not meet the target quality in the previous step 285.

In PSO, multiple agents (or particles) exchanges information with each other and combine information the agents are storing simultaneously to find the optimal solution. The agents are optimized while exchange information with each other, and thus, even when one agent converges to a local optimum, all agents may converge to a global optimum.

In an embodiment, one binary phase filter with j components may be represented by a matrix $\overline{p}_j(t)=\{p_1, p_2, \ldots, p_j\}$, and multiple binary phase filters are optimized in parallel in the PSO algorithm. When N binary phase filters are used, the binary phase filters may be represented by $p_{1j}(t)$, $\overline{p}_{2j}(t), \ldots, \overline{p}_{Nj}(t)$. In the step 281, the N initial binary phase filters may be set to $\overline{p}_{1j}(0), \overline{p}_{2j}(0), \ldots, \overline{p}_{Nj}(0)$ Values constituting $\overline{p}_{1j}(0), \overline{p}_{2j}(0), \ldots, \overline{p}_{Nj}(0)$ may be set either randomly or to predetermined values.

In an embodiment, the step 283 of evaluating the image quality, the step 285 of determining whether the image quality meets the target quality, and the step 287 of adjusting the binary phase filters may be repeated sequentially until the highest image quality meets the target quality. In the step 287, the N binary phase filters are adjusted in parallel. For example, at a time when the step 287 is repeated for the (t+1)th time, an i (i=1, 2, 3, . . . , N)-th binary phase filter may be adjusted based on the local best solution of the i-th binary phase filter up to t-th iteration and the global best solution of all binary phase filters up to the t-th iteration.

In the step 287, the local best solution of the i-th binary phase filter implies the historically best solution of the i-th binary phase filter that shows the best quality evaluation value (or the lowest cost) over the course of t adjustments. Over the course of t adjustments, the i-th binary phase filter may have solutions such as $\bar{p}_{ij}(0)$, $\bar{p}_{ij}(1)$, $p_{ij}(2)$, . . . , $\bar{p}_{ij}(t)$, and a solution that shows the best quality evaluation value (or the lowest cost) among the solutions may be defined as the local best solution of the i-th binary phase filter.

In the step 287, the global best solution of all binary phase filters refers to the historically best solution of a binary phase filter that shows the best result value over the course of the t adjustments. Over the course of t adjustments, the binary phase filters may have solutions such as $\bar{p}_{1j}(0)$, $\bar{p}_{1j}(1)$, . . . , $\bar{p}_{ij}(t)$; . . . ; $\bar{p}_{Nj}(0)$, $\bar{p}_{Nj}(1)$, . . . , $\bar{p}_{Nj}(t)$ and among the solutions, a solution that shows the best quality evaluation value (or the least cost) may be defined as the global best year of all binary phase filters.

For example, the (t+1)-th adjustment of a binary phase filter, performed in the step 287, may be determined by Equations 4 and 5.

$$\bar{p}_{ij}(t+1) = \bar{p}_{ij}(t) + \bar{v}_{ij}(t+1) \quad \text{[Equation 4]}$$

$$\bar{v}_{ij}(t+1) = w * \bar{v}_{ij}(t) + r_1 c_1\left(\bar{p}_{ij.L}(t) - \bar{p}_{ij}(t)\right) + r_2 c_2\left(\bar{p}_{j.G}(t) - \bar{p}_{ij}(t)\right) \quad \text{[Equation 5]}$$

$\bar{p}_{ij}(t)$ is an i-th binary phase filter matrix having j components that has undergone t adjustments, $\bar{v}_{ij}(t)$ is a value for adjusting the binary phase filter matrix in a t-th adjustment, $r_1$ and $r_2$ are random numbers between 0 and 1, $c_1$ and $c_2$ are a cognitive coefficient and social coefficient, respectively, $\bar{p}_{ij.L}(t)$ is the local best solution of an i-th binary phase filter in the t-th adjustment, $\bar{p}_{j.G}(t)$ is the global best solution of all binary phase filters in the t-th adjustment.

The image quality of the binary phase filter, adjusted by the PSO algorithm in the step 287, may be re-evaluated in the step 283, and in the step 285, it may be determined whether the image quality meets the target quality. Depending on the result of the step 285, the adjustment step 287 may be additionally performed, or the optimization may be terminated. When the optimization is terminated, a binary phase filter that meets the target quality may be determined as a final binary phase filter in a step 289.

Hereinafter, the depth extension function due to a binary phase filter will be described with reference to FIGS. 9 to 12.

Figure 9:
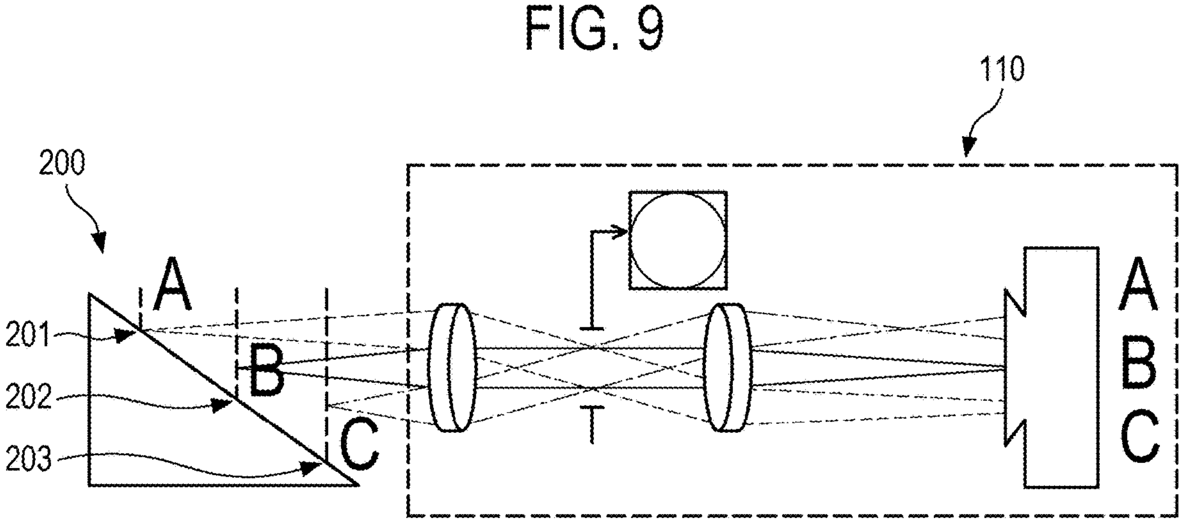
FIG. 9 is a conceptual view illustrating a depth of field in the absence of a binary phase filter.
Figure 10:
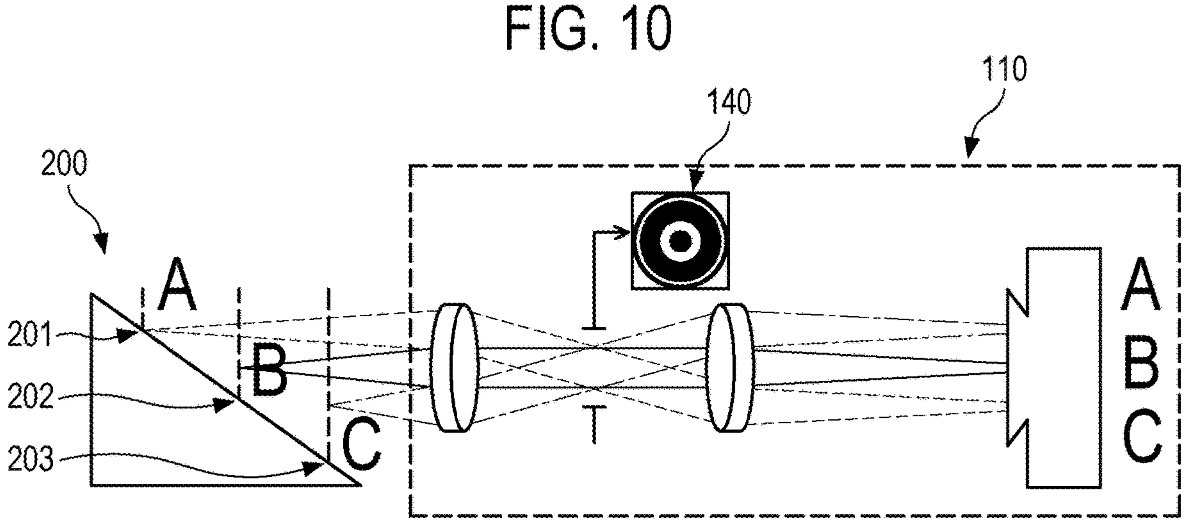
FIG. 10 is a conceptual view illustrating an extended depth of field due to a binary phase filter.

FIG. 9 is a conceptual view illustrating a depth of field in the absence of a binary phase filter. FIG. 10 is a conceptual view illustrating an extended depth of field due to a binary phase filter.

FIG. 9 illustrates the result of imaging an object 200 by using an imaging device 110 without a binary phase filter. The depth of field of the imaging device 110 covers only a second region 202. Therefore, only "B" in the second region 202 is clearly imaged, and the results ("A" and "C") of imaging a first region 201 and a third region 203 are not clear.

On the other hand, FIG. 10 shows the extension of a depth of field due to a binary phase filter 140. The depth of field of an imaging device 110 covers not only a second region 202, but also a first region 201 and a third region 203. Therefore, shapes ("A", "B", and "C") in the first region 201, the second region 202, and the third region 203 may all be clearly imaged.

When an object 200 is imaged using the imaging device 110 in FIG. 9, the binary phase filter 140 illustrated in FIGS. 1 to 4 may be applied to clearly image all of the first region 201, the second region 202, and the third region 203, and the binary phase filter 140 may be designed by the optimization method in FIGS. 5 to 8.

Figure 11:
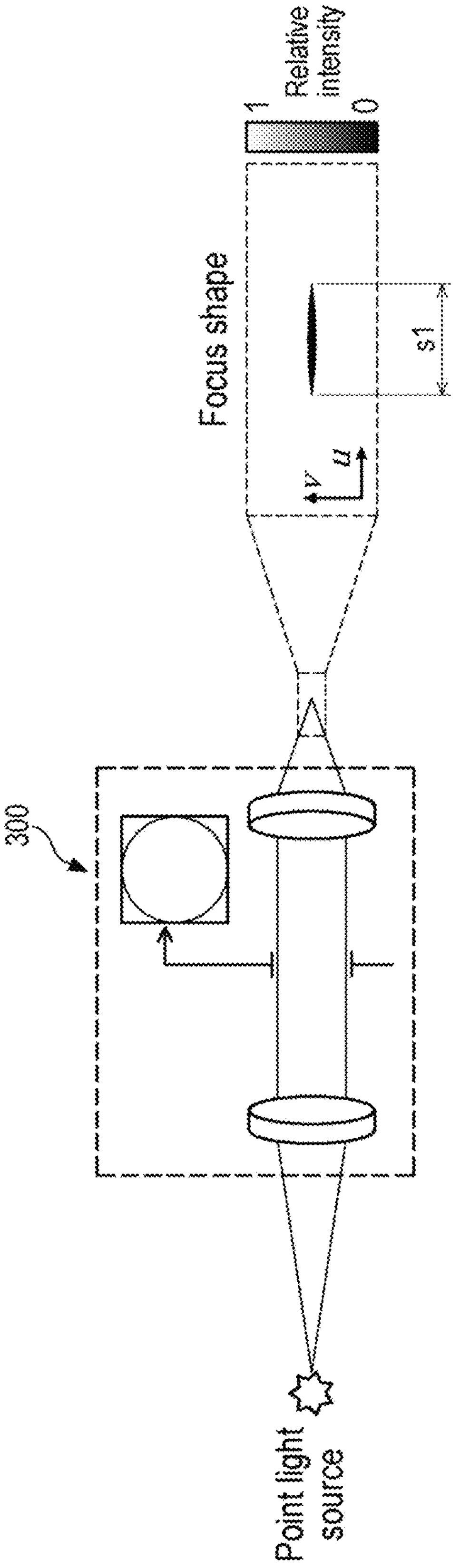
FIG. 11 is a conceptual view illustrating a depth of focus in the absence of a binary phase filter.
Figure 12:
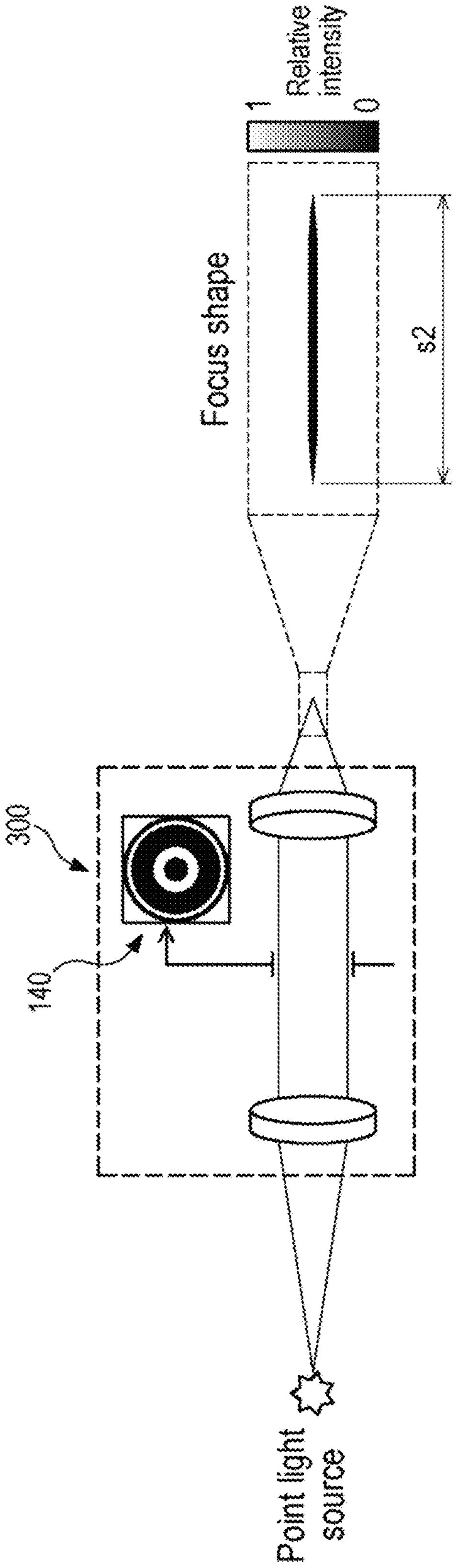
FIG. 12 is a conceptual view illustrating an extended depth of focus due to a binary phase filter.

FIG. 11 is a conceptual view illustrating a depth of focus in the absence of a binary phase filter. FIG. 12 is a conceptual view illustrating an extended depth of focus due to a binary phase filter.

The present disclosure has described a method by which the binary phase filter 140 extends the depth of field, but the binary phase filter 140 may be used to extend the depth of focus. The depth of focus is the range in which the focus is considered to be accurate on an image-forming surface.

Referring to FIGS. 11 and 12, the shape of focus may change depending on the presence or absence of the binary phase filter 140. FIGS. 11 and 12 each illustrate the shape of focus formed after light emitted from a point light source is refracted through an optical system 300. As the focus shape becomes longer in the traveling direction (u) of light, a range in which a focus is formed also becomes longer, and this indicates a deeper depth of focus. A range s2, in which a focus is formed in the presence of the binary phase filter 140, may extend beyond a range s1, in which a focus is formed in the absence of the binary phase filter 140. Using the binary phase filter 140 prevents the shape of the focus from extending in a direction (v) perpendicular to the traveling direction (u) of light, even in the case of the extension from s1 to s2, so that the focus may be sharply formed even when the depth of focus is extended.

Although the method has been described through specific embodiments, the method may also be implemented as computer-readable codes on a computer-readable recording medium. The computer-readable recoding medium includes any type of storage devices for storing data that can be read by computer systems. Examples of the computer-readable recording medium includes ROM, RAM, CD-ROM, a magnetic tape, a floppy disk, an optical data storage device, etc. Also, the computer-readable recoding medium can be distributed to the computer systems which are connected through a network so that the computer-readable codes can be stored and executed in a distribution manner. Furthermore, functional programs, codes and code segments for implementing the foregoing embodiments can be easily inferred by programmers in the art to which the present disclosure pertains.

Although the technical idea of the present disclosure has been described by the examples described in some embodiments and illustrated in the accompanying drawings, it should be noted that various substitutions, modifications, and changes may be made without departing from the technical idea and the scope of the present disclosure which can be understood by those skilled in the art to which the present disclosure pertains. In addition, such substitutions, modifications and changes should be considered to fall within the scope of the appended claims.

What is claimed is:

1. A three-dimensional shape measurement apparatus for measuring a three-dimensional shape of an object, the three-dimensional shape measurement apparatus comprising:

a projector configured to emit patterned light onto the object; and an imaging device configured to image the object, including an optical system, that includes at least one lens defining an optical axis and a binary phase filter disposed on the optical axis so as to transmit light, and configured to form an image by using light that has passed through the at least one lens and the binary phase filter, wherein the binary phase filter comprises: a first portion comprising at least one pattern extending circumferentially around the optical axis; and a second portion distinct from the first portion, wherein the first portion and the second portion have different thicknesses in an optical axis direction that is parallel to the optical axis, wherein in case that $n_1$ is the refractive index of air, $n_2$ is the refractive index of the binary phase filter, and $\lambda_{center}$ is the center wavelength of light emitted by the projector, a difference between the thicknesses of the first portion and the second portion in the optical axis direction is $$\frac{\lambda_{center}/2}{n_2 - n_1}, \text{ and}$$

wherein the at least one lens includes two lenses sharing the optical axis and spaced apart from each other, and the binary phase filter is disposed between the two lenses.

2. The three-dimensional shape measurement apparatus of claim 1, wherein a thickness of the first portion in the optical axis direction is less than a thickness of the second portion in the optical axis direction.

3. The three-dimensional shape measurement apparatus of claim 1, wherein the first portion includes multiple patterns that are concentric with each other and radially spaced apart from each other.

4. The three-dimensional shape measurement apparatus of claim 1, wherein the at least one pattern of the first portion includes an annular pattern.

5. The three-dimensional shape measurement apparatus of claim 1, wherein the second portion is a remaining portion of the binary phase filter excluding the first portion.

6. The three-dimensional shape measurement apparatus of claim 1, wherein the first portion is formed by one of thin film deposition, etching, imprinting, and a holographic film.

7. The three-dimensional shape measurement apparatus of claim 1, wherein the patterned light is a sinusoidal fringe pattern.

8. The three-dimensional shape measurement apparatus of claim 1, further comprising at least one processor configured to generate data related to the three-dimensional shape of the object based on an image of the patterned light emitted onto the object, that is acquired by the imaging device.

* * * * *